US012612730B2

(12) United States Patent
Dong et al.

(10) Patent No.: US 12,612,730 B2
(45) Date of Patent: Apr. 28, 2026

(54) BIOBASED WATER REPELLENT AUXILIARY AND METHOD OF MANUFACTURING THE SAME

(71) Applicant: Industrial Technology Research Institute, Hsinchu (TW)

(72) Inventors: Min-Yan Dong, Hsinchu City (TW); Yu-Ting Chen, Taoyuan City (TW); Albert Wan, Hsinchu City (TW)

(73) Assignee: Industrial Technology Research Institute, Hsinchu (TW)

( * ) Notice: Subject to any disclaimer, the term of this patent is extended or adjusted under 35 U.S.C. 154(b) by 677 days.

(21) Appl. No.: 18/090,509

(22) Filed: Dec. 29, 2022

(65) Prior Publication Data

US 2024/0218589 A1      Jul. 4, 2024

(51) Int. Cl.
*D06M 15/564*      (2006.01)
*C08G 18/06*      (2006.01)
(Continued)

(52) U.S. Cl.
CPC ........... *D06M 15/564* (2013.01); *C08G 18/06* (2013.01); *C08G 18/10* (2013.01); *C08G 18/348* (2013.01);
(Continued)

(58) Field of Classification Search
CPC . D06M 15/564; C08G 18/348; C08G 18/722; C08G 18/724; C08G 18/73;
(Continued)

(56) References Cited

U.S. PATENT DOCUMENTS

| | | | |
|---|---|---|---|
| 5,707,612 A | 1/1998 | Zofchak et al. | |
| 8,952,093 B2 | 2/2015 | Mannari | |

(Continued)

FOREIGN PATENT DOCUMENTS

| | | |
|---|---|---|
| CN | 101684619 | 3/2010 |
| CN | 102782007 | 11/2012 |

(Continued)

OTHER PUBLICATIONS

Yongshang Lu et al., "Soybean-Oil-Based Waterborne Polyurethane Dispersions: Effects of Polyol Functionality and Hard Segment Content on Properties", Biomacromolecules, Oct. 2008, pp. 3332-3340.

(Continued)

*Primary Examiner* — Marc S Zimmer
*Assistant Examiner* — Virginia L Stonehocker
(74) *Attorney, Agent, or Firm* — JCIPRNET

(57) ABSTRACT

A biobased water repellent auxiliary agent and a method of manufacturing the same are provided. The biobased water repellent auxiliary agent includes a molecular complex composed of a polyurethane (PU) dendrimer and a water-based polyurethane dispersion (PUD). The PU dendrimer is formed by polymerizing a trifunctional-group-containing biobased material and an aliphatic linear isocyanate. The water-based PUD includes a monomer derived from the trifunctional-group-containing biobased material, a monomer derived from a cyclic isocyanate, and a monomer derived from a hydrophilic compound. The molecular complex is formed by copolymerizing the PU dendrimer, the trifunctional-group-containing biobased material, the cyclic isocyanate, and the hydrophilic compound.

17 Claims, 2 Drawing Sheets

(51) Int. Cl.

| | |
|---|---|
| *C08G 18/08* | (2006.01) |
| *C08G 18/10* | (2006.01) |
| *C08G 18/34* | (2006.01) |
| *C08G 18/72* | (2006.01) |
| *C08G 18/73* | (2006.01) |
| *C08G 18/75* | (2006.01) |

(52) U.S. Cl.

CPC ......... *C08G 18/722* (2013.01); *C08G 18/724* (2013.01); *C08G 18/73* (2013.01); *C08G 18/735* (2013.01); *C08G 18/755* (2013.01); *C08G 18/0847* (2013.01); *C08G 18/0852* (2013.01); *D10B 2401/022* (2013.01)

(58) Field of Classification Search

CPC ................ C08G 18/735; C08G 18/755; D10B 2401/022; Y10S 977/754; C09D 157/02; C09D 5/022

See application file for complete search history.

(56) References Cited

U.S. PATENT DOCUMENTS

| | | | |
|---|---|---|---|
| 10,781,541 | B2 | 9/2020 | Goijarts et al. |
| 2009/0062432 | A1 | 3/2009 | Doesburg et al. |
| 2010/0280165 | A1* | 11/2010 | Terrenoire ............. C08L 69/00 |
| | | | 524/502 |
| 2012/0214938 | A1 | 8/2012 | Mannari |
| 2016/0108577 | A1 | 4/2016 | Gulati |
| 2017/0369427 | A1 | 12/2017 | Wadgaonkar et al. |
| 2021/0369911 | A1* | 12/2021 | Stumbé ................. C08G 18/73 |

FOREIGN PATENT DOCUMENTS

| | | |
|---|---|---|
| CN | 104562777 | 4/2015 |
| CN | 106068293 | 11/2016 |
| CN | 108350134 | 7/2018 |
| CN | 108909227 | 11/2018 |
| CN | 110128619 | 8/2019 |
| CN | 114621667 | 6/2022 |
| EP | 2359806 | 8/2011 |
| JP | 2002322017 | 11/2002 |
| TW | 201120079 | 6/2011 |
| TW | 201503447 | 1/2015 |
| TW | I572670 | 3/2017 |
| TW | I699470 | 7/2020 |
| TW | I730958 | 6/2021 |

OTHER PUBLICATIONS

"Office Action of Taiwan Counterpart Application", issued on Sep. 26, 2023, p. 1-p. 4.

* cited by examiner

S200

Polymerize a trifunctional-group-containing biobased material with an aliphatic linear isocyanate to form a polyurethane dendrimer

S202

Copolymerize the polyurethane dendrimer with the trifunctional-group-containing biobased material, a cyclic isocyanate and a hydrophilic compound

BIOBASED WATER REPELLENT AUXILIARY AND METHOD OF MANUFACTURING THE SAME

TECHNICAL FIELD

The disclosure relates to a biobased chemical, and particularly to a biobased water repellent auxiliary agent and a method of manufacturing the same in the field of textiles.

BACKGROUND

Due to climate change caused by industrialization, human reflection on environmental issues has been increasingly acknowledged. Products that are manufactured using biobased chemicals and renewable resources have attracted attention in the market. International brands are exploring the potential technologies and strategy developments of biobased materials, which are considered to be groundbreaking materials that exhibit resource sustainability and carbon reduction effect.

Though, the dyeing and finishing industries have been progressively transited towards water-saving/energy-saving processes, and simultaneously have been changed towards digital precision production. However, several textile auxiliary agents still do not meet the carbon reduction requirements, such as the current commercial water repellent auxiliary agents mostly use organic solvents, which are toxic and require higher waste treatment cost.

SUMMARY

The disclosure provides a biobased water repellent auxiliary agent and a manufacturing method thereof, which can effectively improve the biobased content, the spray printing performance and the water repellency of the water-repellent agent, which can be environmentally friendly and can reduce the waste treatment cost.

The biobased water repellent auxiliary agent of the present disclosure includes a molecular complex composed of a polyurethane (PU) dendrimer and a water-based polyurethane dispersion (PUD). The PU dendrimer is formed by polymerizing a trifunctional-group-containing biobased material and an aliphatic linear isocyanate. The water-based polyurethane dispersion includes a monomer derived from the trifunctional-group-containing biobased material, a monomer derived from a cyclic isocyanate, and a monomer derived from a hydrophilic compound. The molecular complex is formed by copolymerizing the polyurethane dendrimer, the trifunctional-group-containing biobased material, the cyclic isocyanate, and the hydrophilic compound.

The method of manufacturing a biobased water repellent auxiliary agent of the present disclosure includes a first step of polymerizing a trifunctional-group-containing biobased material and an aliphatic linear isocyanate to form a polyurethane dendrimer, and a second step of copolymerizing the polyurethane dendrimer, the trifunctional-group-containing biobased material, a cyclic isocyanate and a hydrophilic compound.

Based on the above, the disclosure provides a method of manufacturing a biobased water repellent auxiliary agent, which can effectively improve the biobased content and the printability of the water repellent agent, due to the novel molecular structural design of a water-based polyurethane dispersion (PUD) and a PU dendrimer and its two-step preparation method. The prepared biobased water repellent auxiliary agent can be coated on the surface of a fiber by spray printing, so as to endow the fabric with water repellency, and at the same time effectively reduce the material consumption of the process and therefore achieve comprehensive carbon reduction.

In order to make the above-mentioned features of the present disclosure more comprehensible, the following specific examples are given together with the attached drawings for detailed description as follows.

DESCRIPTION OF THE EMBODIMENTS

Figure 1:
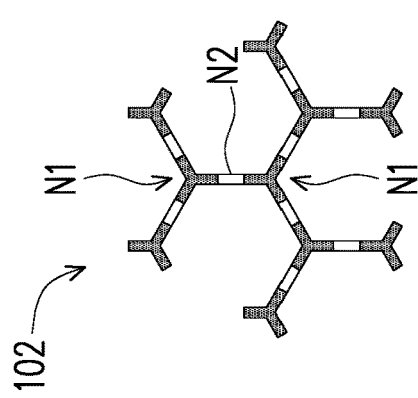
FIG. 1 is a schematic structural view of a biobased water repellent auxiliary agent according to the first embodiment of the present disclosure.
Figure 1:
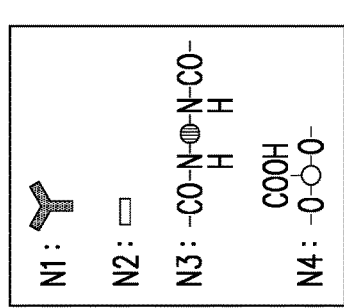
Figure 1:
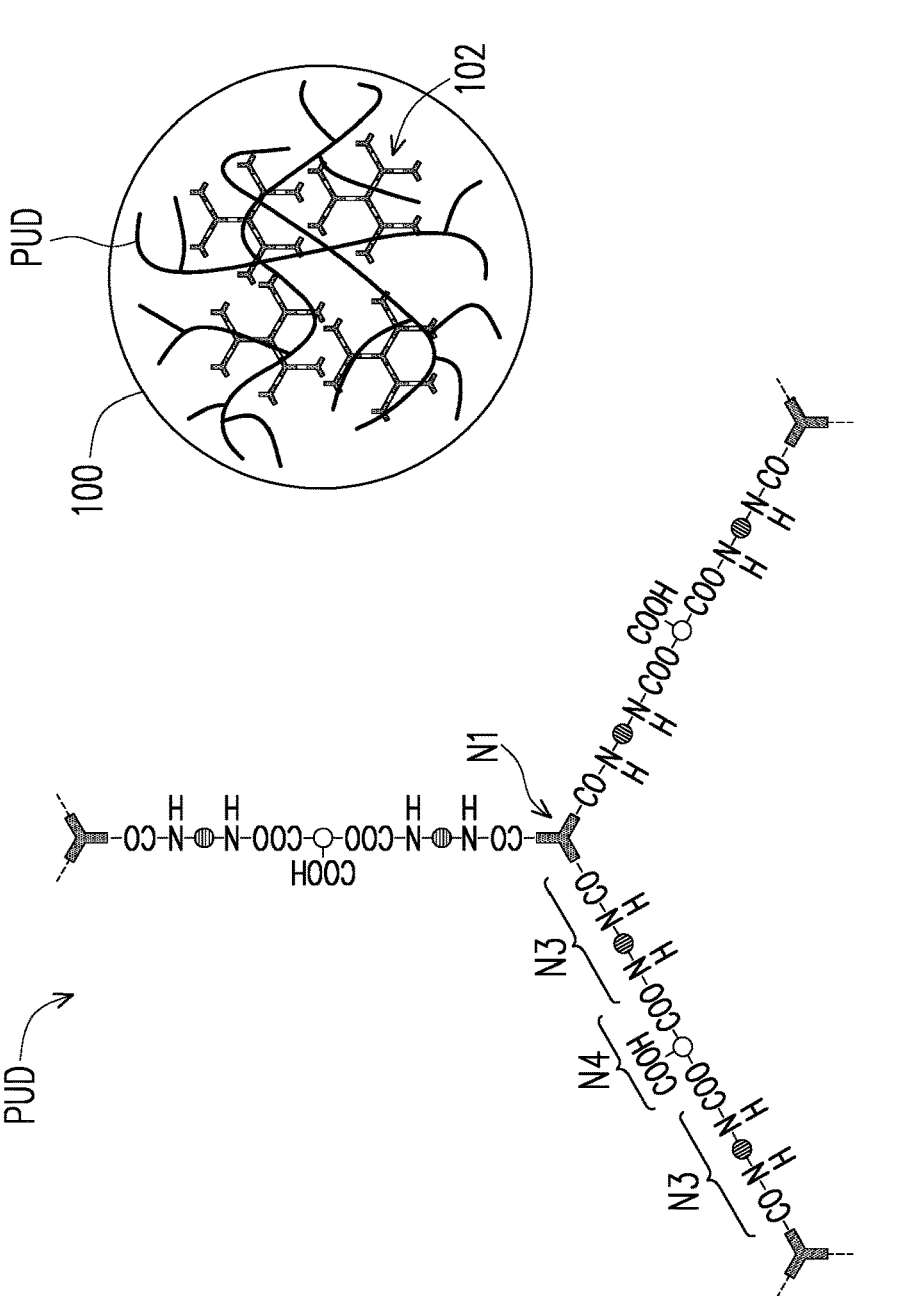

Embodiments are listed below and described in details with accompanying drawings, but the provided embodiments are not intended to limit the scope of the present disclosure. In addition, the dimensions of the components in the drawings are drawn for the convenience of description, and the drawings are not necessarily drawn to scale.

FIG. 1 is a schematic structural view of a biobased water repellent auxiliary agent according to the first embodiment of the present disclosure.

Referring to FIG. 1, the biobased water repellent auxiliary agent 100 of this embodiment includes a molecular complex composed of a polyurethane (PU) dendrimer 102 and a water-based polyurethane dispersion PUD. For clarity, the polyurethane dendrimer 102 is shown alone on the right in FIG. 1 and the water-based polyurethane dispersion (PUD) is shown alone on the left in FIG. 1. The polyurethane dendrimer 102 is polymerized from a trifunctional-group-containing biobased material and an aliphatic linear isocyanate, so the polyurethane dendrimer 102 obtained by polymerization contains a monomer N1 derived from the trifunctional-group-containing biobased material and a monomer N2 derived from the aliphatic linear isocyanate, and thus, the three functional groups of the monomer N1 derived from the trifunctional-group-containing biobased material are combined with the two ends of the monomer N2 derived from the aliphatic linear isocyanate to form a multi-level dendritic structure. The water-based polyurethane dispersion PUD includes a monomer N1 derived from a trifunctional-group-containing biobased material, a monomer N3 derived from a cyclic isocyanate, and a monomer N4 derived from a hydrophilic compound, and thus, the three functional groups of the monomer N1 derived from the trifunctional-group-containing biobased material are combined with the monomer N3 derived from the cyclic isocyanate, and the two monomers N3 of cyclic isocyanates are linked through the monomer N4 of the hydrophilic compound.

The biobased water repellent auxiliary agent 100 of this embodiment is formed by copolymerizing the polyurethane dendrimer 102 with the trifunctional-group-containing biobased material, the cyclic isocyanate and the hydrophilic compound. Therefore, during the formation of the water-based polyurethane dispersion, the water-based polyurethane dispersion can be used in combination with a hydrophobic polyurethane dendrimer to form a water-repellent molecular complex. Besides, the dispersibility of the molecular complex in water can be enhanced by tuning the process conditions (such as adjusting the content of the monomer N4 derived from the hydrophilic compound). Once the dispersibility of the biobased water repellent auxiliary agent 100 is improved, the coverage and permeability of the biobased water repellent auxiliary agent 100 coated on the fabric is enhanced, so as to have the fabric with excellent water repellency.

In one embodiment, the trifunctional-group-containing biobased material includes castor oil.

In one embodiment, the aliphatic linear isocyanate includes hexamethylene diisocyanate (HDI), pentamethylene diisocyanate (PDI), L-lysine diisocyanate (LDI), or a combination thereof.

In one embodiment, the cyclic isocyanate includes isophorone diisocyanate (IPDI), 4,4'-diisocyanato dicyclohexylmethane (HMDI) or a combination thereof.

In one embodiment, the hydrophilic compound includes at least two hydroxyl groups and at least one carboxyl group. For example, the hydrophilic compound includes glyceric acid, dimethylol propionic acid (DMPA), dimethylol butyric acid (DMBA), or a combination thereof.

In one embodiment, the biobased water repellent auxiliary agent includes 5-12 wt % of the polyurethane dendrimer, 15-30 wt % of the water-based polyurethane dispersion, and the rest is water.

The biobased water repellent auxiliary agent of the first embodiment is suitable for the textile manufacturing industry. The biobased water repellent auxiliary agent of the first embodiment can be coated on the surface of fabric (fiber) by spray printing, so as to endow the fabric with water repellency and greatly reduce the cost of the material consumption and the wastewater treatment.

Moreover, according to the type of fabric, thickness and other specifications, the content percentage can be appropriately adjusted to achieve the desired water repellent effect. For example, the water-repellent effect can be achieved when the content of the biobased water repellent auxiliary agent of the present disclosure is 5 wt % or more. On the other hand, from the viewpoint of cost saving, the water repellency requirements of most fabrics can be met when the content of the biobased water repellent auxiliary agent of the present disclosure is 20 wt % or less. However, the present disclosure is not limited thereto.

Figure 2:
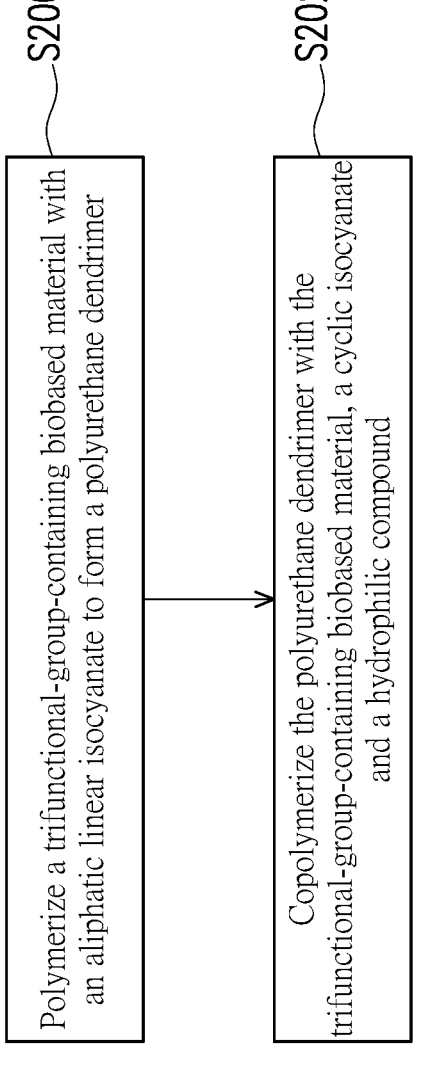
FIG. 2 is a flow chart of a method of manufacturing a biobased water repellent auxiliary agent according to the second embodiment of the present disclosure.

FIG. 2 is a flow chart of a method of manufacturing a biobased water repellent auxiliary agent according to the second embodiment of the present disclosure.

Referring to FIG. 2, in the process flow of this embodiment, step S200 is first performed, in which a trifunctional-group-containing biobased material and an aliphatic linear isocyanate are polymerized to form a polyurethane dendrimer. In step S200, the weight ratio of the trifunctional-group-containing biobased material to the aliphatic linear isocyanate may be, for example but not limited to, from 3:1 to 6:1, or 7.05:1. The trifunctional-group-containing biobased material in step S200 may be castor oil. The aliphatic linear isocyanate in step S200 may include, for example but not limited to, hexamethylene diisocyanate (HDI), pentamethylene diisocyanate (PDI), L-lysine diisocyanate (LDI) or a combination thereof.

Then, step S202 is performed, in which the polyurethane dendrimer obtained from the previous step S200 is copolymerized with a trifunctional-group-containing biobased material, a cyclic isocyanate and a hydrophilic compound. The trifunctional-group-containing biobased material in step S202 may be castor oil. That is, the trifunctional-group-containing biobased materials used in step S200 and step S202 are both castor oil, but the present disclosure is not limited thereto. The cyclic isocyanate in step S202 may include, for example but not limited to, isophorone diisocyanate (IPDI), 4,4'-diisocyanato dicyclohexylmethane (HMDI) or a combination thereof. The hydrophilic compound in step S202 includes at least two hydroxyl groups and at least one carboxyl group. The hydrophilic compound in step S202 may include, for example but not limited to, glyceric acid, dimethylol propionic acid (DMPA), dimethylol butyric acid (DMBA), or a combination thereof. In step S202, the weight ratio of the trifunctional-group-containing biobased material to the cyclic isocyanate may be, for example but not limited to, 1:0.5 to 1:2, or 1:2.16; the weight ratio of the trifunctional-group-containing biobased material to the hydrophilic compound may be, for example but not limited to, 1:0.5 to 1:3; the weight ratio of the trifunctional-group-containing biobased material to the polyurethane dendrimer may be, for example but not limited to, 1:0.5 to 1:4.

Several experiments are listed below to verify the efficacy of the present disclosure, but these experiments and the results are not intended to limit the scope of the present disclosure.

Experimental Example 1

First, 5.7 wt % of hexamethylene diisocyanate (HDI) and 40.2 wt % of castor oil were stirred and reacted (called "stirring reaction" in some examples) in acetone at 50-60° C. for 30 minutes to obtain a polyurethane dendrimer.

Thereafter, 8.0 wt % of the polyurethane dendrimer, 3.7 wt % of castor oil, 5 wt % of dimethylol propionic acid (DMPA) were mixed with 0.01 wt % of TzBn as a catalyst in acetone, 8.0 wt % of isophorone diisocyanate (IPDI) was then added dropwise therein, and stirred and reacted at 50-60° C. for 3 hours to complete the copolymerization.

Next, deionized water was added to the product (with a volume ratio of the deionized water to the product of 3:1) at 50-60° C., a chain extender was then added, and stirred for 1 hour.

Acetone was separated from the product by distillation at 50° C., and the remaining solution was diluted to obtain a biobased water repellent auxiliary agent with a solid content of 4.5 wt %.

Then, the biobased water repellent auxiliary agent was injected into a direct-spraying machine, and then spray-printed (called "spray printing" in some examples) on the surface of a fabric. The spray-printed fabric was shaped at 150° C. for 150 seconds to obtain a sample.

The water repellency of the sample was tested with the AATCC 22 spray rating standard test issued by the American Association of Textile Chemists and Colorists (AATCC), and the result was recorded in Table 1 below.

Comparative Example 1

First, 3 wt % of EX-622 (DENACOL™) and 30 wt % of castor oil were reacted in tetrahydrofuran (THF) solvent at 80° C. for 24 hours to obtain a dendrimer.

Thereafter, 8 wt % of the dendrimer, 4 wt % of castor oil, 5 wt % of dimethylol propionic acid (DMPA), and 0.01 wt % of TzBn were mixed in acetone, and 8 wt % of isophorone diisocyanate (IPDI) was then added dropwise therein and stirred at 50-60° C. for 30 minutes to complete the copolymerization.

Next, a sample was obtained using the same spray printing conditions as those described in Experimental Example 1.

The water repellency of the sample was tested with the AATCC 22 spray rating standard, and the result was recorded in Table 1 below.

Comparative Example 2

A sample was obtained using the same preparation method and spray printing conditions as those described in Experimental Example 1, but IPDI used in the copolymerization was changed to aliphatic linear isocyanate HDI.

The water repellency of the sample was also tested with the AATCC 22 spray rating standard, and the result was recorded in Table 1 below.

Comparative Example 3

25 wt % of hexamethylene diisocyanate (HDI) and 75 wt % of castor oil were stirred and reacted in acetone at 50-60° C. for 30 minutes to obtain a polyurethane dendrimer.

Comparative Example 4

4 wt % of castor oil, 5 wt % of dimethylol propionic acid (DMPA) and 0.01 wt % of TzBn were mixed in acetone, 8 wt % of isophorone diisocyanate (IPDI) was then added dropwise therein, and stirred and reacted at 50-60° C. for 3 hours to complete the copolymerization.

Next, deionized water was added to the product (with a volume ratio of deionized water to product being 3:1) at 50-60° C., a chain extender was then added, and stirred for 1 hour.

Acetone was separated from the product by distillation at 50° C., and the remaining solution was diluted to obtain a biobased water repellent auxiliary agent having 4.5 wt % of solids.

Next, a sample was obtained using the same spray printing conditions as those described in Experimental Example 1.

The AATCC 22 spray rating standard was also used to test the water repellency of the sample, and the result was recorded in Table 1 below.

TABLE 1

| | Polyurethane dendrimer | | Copolymerization | | | Water repellency |
| | Compositions | Conditions | Compositions | Conditions | Process | AATCC 22 |
|---|---|---|---|---|---|---|
| Experimental Example 1 | HDI 5.7 wt % castor oil 40.2 wt % | 50-60° C. stirring reaction 30 mins | IPDI 8 wt % castor oil 3.7 wt % polyurethane dendrimer 8 wt % DMPA 5 wt % | 50-60° C. stirring reaction 3 hrs | surface spray printing | 90-100 |
| Comparative Example 1 | EX-622 3 wt % castor oil 30 wt % | 80° C. stirring reaction 24 hrs | IPDI 8 wt % castor oil 4 wt % polyurethane dendrimer 8 wt % DMPA 5 wt % | 50-60° C. stirring reaction 30 mins | surface spray printing | 0 |
| Comparative Example 2 | HDI 5.7 wt % castor oil 40.2 wt % | 50-60° C. stirring reaction 30 mins | HDI 8 wt % castor oil 3.7 wt % polyurethane dendrimer 8 wt % DMPA 2.8 wt % | 50-60° C. stirring reaction 3 hrs | surface spray printing | 0 |
| Comparative Example 3 | HDI 25 wt % castor oil 75 wt % | 50-60° C. stirring reaction 30 mins | | | surface spray printing | 0 |
| Comparative Example 4 | | | IPDI 8 wt % castor oil 4 wt % DMPA wt 5% | 50-60° C. stirring reaction 3 hrs | surface spray printing | 50 |

Next, deionized water was added to the product (with a volume ratio of the deionized water to the product of 3:1) at 50-60° C., a chain extender was then added, and stirred for 1 hour.

Acetone was separated from the product by distillation at 50° C., and the remaining solution was diluted to obtain a biobased water repellent auxiliary agent having a solid content of 4.5 wt %.

Next, a sample was obtained using the same spray printing conditions as those described in Experimental Example 1.

The water repellency of the sample was tested with the AATCC 22 spray rating standard, and the result was recorded in Table 1 below.

As shown in Table 1, the water repellency of Experimental Example 1 is obviously better than that of each of the Comparative Examples 1-4.

Experimental Examples 2-3

Samples were obtained using the same preparation method and spray printing conditions as those described in Experimental Example 1, wherein the contents of DMPA used in the copolymerization step were changed to 4 wt % and 3 wt %, respectively.

The water repellency of each sample was also tested with the AATCC 22 spray rating standard, and the results were recorded in Table 2 below.

TABLE 2

| | Polyurethane dendrimer | | Copolymerization | | | Water repellency |
| | Composition | Condition | Composition | Condition | Process | AATCC 22 |
| --- | --- | --- | --- | --- | --- | --- |
| Experimental Example 1 | HDI 5.7 wt % castor oil 40.2 wt % | 50-60° C. stirring reaction 30 mins | IPDI 8 wt % castor oil 3.7 wt % polyurethane dendrimer 8 wt % DMPA 5 wt % | 50-60° C. stirring reaction 3 hrs | surface spray printing | 90-100 |
| Experimental Example 2 | HDI 5.7 wt % castor oil 40.2 wt % | 50-60° C. stirring reaction 30 mins | IPDI 8 wt % castor oil 3.7 wt % polyurethane dendrimer 8 wt % DMPA 4 wt % | 50-60° C. stirring reaction 3 hrs | surface spray printing | 80 |
| Experimental Example 3 | HDI 5.7 wt % castor oil 40.2 wt % | 50-60° C. stirring reaction 30 mins | IPDI 8% castor oil 3.7 wt % polyurethane dendrimer 8 wt % DMPA 3 wt % | 50-60° C. stirring reaction 3 hrs | surface spray printing | 70 |

As shown in Table 2, the water repellency level can be changed by adjusting the content of the hydrophilic compound DMPA.

Comparative Example 5

The drying rate of a B.K. fabric without a surface water-repellent treatment was tested with the AATCC 201 standard test method, and the result was recorded in Table 3 below.

Experimental Examples 4-5

Fabric:

1. In Experimental Example 4, (6.0 wt % of) the biobased water repellent auxiliary agent of Experimental Example 1 was spray-printed on the surface of a B.K. fabric composed of multiple patterns of hexagon frames, in which the hexagons are open-space penetrable to water. The area of each hexagon is 3.37 cm$^2$, and the percentage ratio of the area of the solid frames to that of open-space hexagons is 28.9%: 71.1%.

2. In Experimental Example 5, (6.0 wt % of) the biobased water repellent auxiliary agent of Experimental Example 1 was spray-printed on the surface of a B.K. fabric composed of multiple patterns of solid hexagons, in which the surrounding frames are open-space penetrable to water. The area of each hexagon is 3.37 cm$^2$, and the percentage ratio of the area of the open-space frames to that of solid hexagons is 28.9%:71.1%.

Next, samples were obtained using the same spray printing conditions as those described in Experimental Example 1.

The drying rate of each sample was tested according to the AATCC 201 standard test method, and the results were recorded in Table 3 below.

TABLE 3

| | Droplet amount (g) | Total weight of fabric and water (g) | Weight of fabric after 30 mins (g) | Drying rate of fabric (AATCC 201) |
| --- | --- | --- | --- | --- |
| Comparative Example 5 | 0.123 g | 2.8030 g | 2.7141 g | 72.3% |
| Experimental Example 4 | 0.101 g | 2.9715 g | 2.8997 g | 71.1% |
| Experimental Example 5 | 0.114 g | 3.0128 g | 2.9183 g | 82.8% |

As shown in Table 3, the drying rate can be improved by changing the printing patterns.

In view of the above, the biobased water repellent auxiliary agent of the present disclosure can effectively increase the biobased content of the water repellent agent to achieve the carbon reduction. Besides, the biobased water repellent auxiliary agent of the present disclosure can be coated on the surface of a fiber by spray printing, so as to endow the fabric with water repellency, and at the same time can greatly reduce the material consumption and save the subsequent (wastewater) treatment cost.

Although the present disclosure has been disclosed above with the embodiments, it is not intended to limit the present disclosure. Anyone with ordinary knowledge in the technical field may make some changes and modifications without departing from the spirit and scope of the present disclosure. The scope of protection of the present disclosure should be defined by the scope of the appended patent application.

What is claimed is:

1. A biobased water repellent auxiliary agent, comprising:
   a molecular complex composed of a polyurethane dendrimer and a water-based polyurethane dispersion, wherein
   the polyurethane dendrimer is formed by polymerizing a trifunctional-group-containing biobased material and an aliphatic linear isocyanate,
   the water-based polyurethane dispersion comprises the trifunctional-group-containing biobased material, a cyclic isocyanate, and a hydrophilic compound, and
   the molecular complex is formed by copolymerizing the polyurethane dendrimer with the trifunctional-group-containing biobased material, the cyclic isocyanate and the hydrophilic compound.

2. The biobased water repellent auxiliary agent of claim 1, wherein the trifunctional-group-containing biobased material comprises castor oil.

3. The biobased water repellent auxiliary agent of claim 1, wherein the aliphatic linear isocyanate is selected from the group consisting of hexamethylene diisocyanate (HDI), pentamethylene diisocyanate (PDI), L-lysine diisocyanate (LDI) and a combination thereof.

4. The biobased water repellent auxiliary agent of claim 1, wherein the cyclic isocyanate is selected from the group consisting of isophorone diisocyanate (IPDI), 4,4'-diisocyanato dicyclohexylmethane (HMDI) and a combination thereof.

5. The biobased water repellent auxiliary agent of claim 1, wherein the hydrophilic compound comprises at least two hydroxyl groups and at least one carboxyl group.

6. The biobased water repellent auxiliary agent of claim 5, wherein the hydrophilic compound is selected from the group consisting of glyceric acid, dimethylol propionic acid (DMPA), dimethylol butyric acid (DMBA) and a combination thereof.

7. The biobased water repellent auxiliary agent of claim 1, wherein the biobased water repellent auxiliary comprises 5 to 12 wt % of the polyurethane dendrimer, 15 to 30 wt % of the water-based polyurethane dispersion, and the rest is water.

8. A method of manufacturing a biobased water repellent auxiliary agent, comprising:

a first step of polymerizing a trifunctional-group-containing biobased material with an aliphatic linear isocyanate to form a polyurethane dendrimer; and a second step of copolymerizing the polyurethane dendrimer with the trifunctional-group-containing biobased material, a cyclic isocyanate and a hydrophilic compound.

9. The method of claim 8, wherein in the first step, a weight ratio of the trifunctional-group-containing biobased material to the aliphatic linear isocyanate is 3:1 to 6:1, or 7.05:1.

10. The method of claim 8, wherein in the second step, a weight ratio of the trifunctional-group-containing biobased material to the cyclic isocyanate is 1:0.5 to 1:2, or 1:2.16.

11. The method of claim 8, wherein in the second step, a weight ratio of the trifunctional-group-containing biobased material to the hydrophilic compound is 1:0.5 to 1:3.

12. The method of claim 8, wherein in the second step, a weight ratio of the trifunctional-group-containing biobased material to the polyurethane dendrimer is 1:0.5 to 1:4.

13. The method of claim 8, wherein the trifunctional-group-containing biobased material comprises castor oil.

14. The method of claim 8, wherein the aliphatic linear isocyanate is selected from the group consisting of hexamethylene diisocyanate (HDI), pentamethylene diisocyanate (PDI), L-lysine diisocyanate (LDI) and a combination thereof.

15. The method of claim 8, wherein the cyclic isocyanate is selected from the group consisting of isophorone diisocyanate (IPDI), 4,4'-diisocyanato dicyclohexylmethane (HMDI) and a combination thereof.

16. The method of claim 8, wherein the hydrophilic compound comprises at least two hydroxyl groups and at least one carboxyl group.

17. The method of claim 16, wherein the hydrophilic compound is selected from the group consisting of glyceric acid, dimethylol propionic acid (DMPA), dimethylol butyric acid (DMBA), and a combination thereof.

* * * * *